Oct. 7, 1969     R. S. CONGLETON ET AL     3,471,800

RESONANT REFLECTOR FOR LASER BEAM OUTPUT

Filed Dec. 17, 1964

INVENTORS.
ROBERT S. CONGLETON,
MARY L. SPAETH,
BY John M. Koch
ATTORNEY.

United States Patent Office 3,471,800
Patented Oct. 7, 1969

3,471,800
RESONANT REFLECTOR FOR LASER BEAM OUTPUT
Robert S. Congleton, Canoga Park, and Mary L. Spaeth, Inglewood, Calif., assignors to Hughes Aircraft Company, Culver City, Calif., a corporation of Delaware
Filed Dec. 17, 1964, Ser. No. 419,109
Int. Cl. H01s 3/05
U.S. Cl. 331—94.5                    10 Claims

ABSTRACT OF THE DISCLOSURE

The invention is a resonant reflector utilized in a laser regenerative cavity of a high power density laser to provide for mechanical, thermal and chemical stability. This resonant reflector comprises two layers of transparent material of substantially equal thickness and of relatively high index of refraction separated by a layer of relatively low index of refraction material, the thickness of the three layers being predetermined so that each layer has a plurality of resonances within the fluorescent linewidth of the laser output beam generated by the laser. Accordingly, a specific embodiment of the invention consists of two discs of glass separated by a layer of air where the thickness of the glass disc and the separation between them provides the required plurality of resonances.

---

As is known in the art, a reflector is located at either end of the body of laser material. At the output beam end of the laser, the reflector transmits an output beam and reflects a portion of the laser output back into the body of laser material. In the case of high power lasers, such as the ruby laser, for example, high power effects present a problem even when the laser is operated in a pulse mode, such as when used for range finding, as in a colidar device. Similar high power problems are encountered in the use of high power laser beams for welding and other applications.

Among prior art laser output beam reflector elements, in addition to specular reflectors, which are not satisfactory because they are destroyed by high power density beams, are the resonant reflector elements such as those which use a plurality of alternately high index of refraction and low index of refraction quarter wave layers, commonly called multilayer dielectric reflectors, and those which use a plurality of resonant transparent flat plates. The prior art multilayer dielectric reflectors suffer from deterioration or age changes in the dielectric layer when used with high power lasers and the dielectric layers are destroyed by laser output power in the 100 megawatt per square centimeter range. The multilayer dielectric reflectors also are not resistant to abrasion and have the disadvantage that their use results in a beam having relatively wide spectral width, thus resulting in reduced spectral radiance.

The prior art resonant reflector using a plurality of resonant transparent flat plates is exemplified by a specific reflector employing three layers of different optical path length. Namely, a first plate of sapphire of one millimeter thickness, a second layer of air one millimeter thick and a third plate of sapphire three millimeters thick. To achieve an effective reflectivity maximum near the theoretical limit for this type of prior art reflector, there must exist a frequency of emitted light in the laser output beam which is resonant for all three of the optical paths of the three layers of this prior art reflector. Thus, when using a ruby laser, within the 3 A. fluorescent line width, there are 2.2 resonances in the one millimeter sapphire layer, 1.24 resonances in the air layer and 6.5 resonances in the three millimeter sapphire layer. With these three resonances being randomly positioned within the fluorescent line width of the ruby laser, in this manner, it is evident that, in general, these three resonances will not fall on top of each other, and the theoretical maximum reflectivity will not be achieved.

Furthermore, this latter type of prior art sapphire resonant reflector is undesirably temperature-dependent. Temperature changes of only several degrees cause considerable movement of the positions of the resonances in each of the three layers. As the positions of the resonances move with respect to each other, the effective reflectivity of the reflector varies objectionably. Thus unless there are many resonances within the fluorescent line width of the laser beam employed with the reflector, large variations in the effective reflectivity will be observed.

Accordingly, it is a principal object of this invention to provide a resonant reflector for use with a laser which is stable and durable and has a long service life capability even when used with extremely high power output lasers.

Another primary object of this invention is to provide a resonant reflector for use with a laser which will result in the substantial achievement of the theoretical maximum reflectivity for the particular laser beam with which the reflector is used.

A further object of this invention is to provide such a stable, durable resonant reflector which will result in the substantial achievement of the theoretical maximum reflectivity for use with a ruby laser output beam and for which the effective reflectivity will remain substantially constant with temperature variations.

Additional objects of this invention will become apparent from the following description, which is given primarily for purposes of illustration, and not limitation.

Stated in general terms, the objects of this invention are attained by providing a resonant reflector for use with laser material in a laser which includes two equal layers or plates of transparent material, equal within about one-eighth wavelength of the frequency for which the reflector is designed, of predetermined thickness, separated by a layer of low index of refraction material, such as a gas, preferably air. The thicknesses of the layers or plates of transparent material and of the air, gas or other low index of refraction material are chosen so that the layers or plates of the transparent material and the said layer of low index of refraction material, such as air, each have a plurality of resonances within the fluorescent line width of the laser material employed, preferably at least five resonances, and especially more than about eight resonances. Any transparent material which is resistant to the mechanical and thermal stresses of high power laser emission is satisfactory for use in the layers or plates of transparent material. Examples of such suitable transparent materials are: glass, sapphire, quartz, zircon, mica, etc. Transparent plastics and resins would be suitable if they could be made chemically, mechanically and thermally stable while transmitting high power laser emission.

A more detailed description of a specific embodiment of the resonant reflector of the invention is given hereinbelow with reference to the appended drawing, wherein.

The resonant reflector of this invention can be viewed as being a multiple Fabry-Perot etalon. The maximum reflectivity of such a device is given by the following equation:

$$R = \left(\frac{n^N - 1}{n^N + 1}\right)^2$$

where:

n=index of refraction of the transparent material, and
N=the number of air-transparent material interfaces.

For a resonant reflector employing two transparent layers, that is, four air-transparent material interfaces, the desired reflectivity of the device can be obtained by making the transparent layers of a material having the desired index of refraction, as computed from the formula given above.

For such a device, the change in reflectivity with temperature is very small. For example, in a resonant reflector made with two equal glass or sapphire, or other transparent material layers or plates, and a spacing layer of air of about one-fourth inch thickness, as applied for use with a ruby laser, the maximum change in the reflectivity of the device from the theoretical maximum, due to random differences in the positions of the resonances in the transparent material layers, the air layer, or due to temperature changes is less than about 5 percent of the maximum reflectivity.

The two transparent material layers or plates should have substantially equal thickness, preferably differing from each other in thickness by less than about one-eighth wavelength, so that their two sets of resonances are very close to exactly overlapping within the fluorescent line width of the laser material with which the resonant reflector is to be used. For glass plates, for example, with refractive indices in the range of from about 1.45 to about 1.70, there are from about 11.5 to about 13.5 resonances within the ruby laser fluorescent line width for two 0.25 inch thick glass plates or layers, and about 8.0 resonances in a 0.25 inch layer of air. Thus the capability of locating two resonances very near each other in the center of the fluorescent bandwidth of ruby laser material is very good. At some point within the 3 A. fluorescent line width of ruby, centered at 6943 A., the reflectivity of the resonant reflector should be within 95% and 100% of the maximum theoretical reflectivity.

Figure 1:
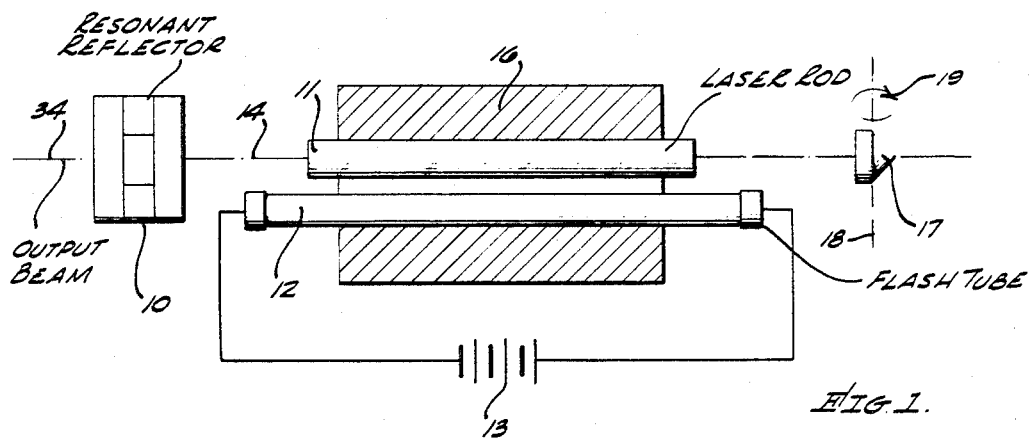
FIG. 1 is a schematic elevational view showing the use of the resonant reflector in alignment with the output beam of a laser.

FIG. 1 schematically shows the use of a resonant reflector 10 of the invention at the output beam end of a ruby laser rod 11. A pumping light source 12, such as a xenon flash tube, powered by a power supply 13, is used to pump ruby laser rod 11 to a state of stimulated emission to produce a laser output beam 14, with the aid of an enclosure or reflector 16, in the manner known in the art. A reflector 17, such as a mirror, total internally reflecting prism, etc. is mounted at the end of ruby laser rod 11 to feed back the laser emission to the ruby rod. Reflector 17, or roof prism 17 can be rotated about vertical axes 18 as indicated by an arrow at 19 to produce pulses of output beam 14 as in the case of coherent light detecting and ranging, or Colidar, devices.

It will be understood, however, that resonant reflector 10 can be used with continuous wave lasers, gas as well as solid, even though it is shown used with a solid pulse laser in FIG. 1. The laser can be used for signaling, welding, medical applications and in general for all types of lasers where a reflector element is desired at the output end of the laser material. In some cases, a resonant reflector 10 can be used at either end of the laser material.

Figure 3:
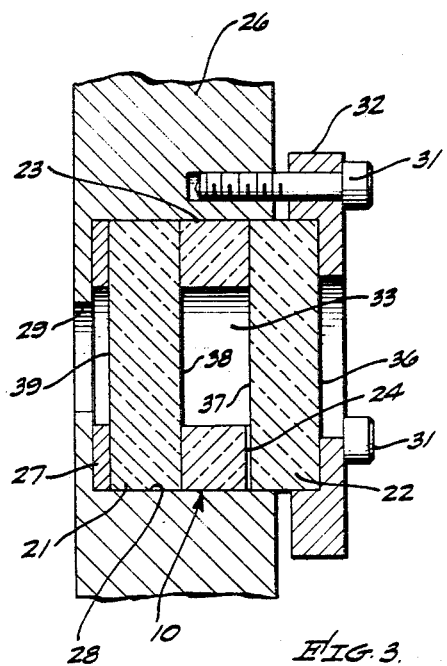
FIG. 3 is a sectional elevational view taken along line 3—3 of FIG. 2 showing additional structural details of the resonant reflector.
Figure 2:
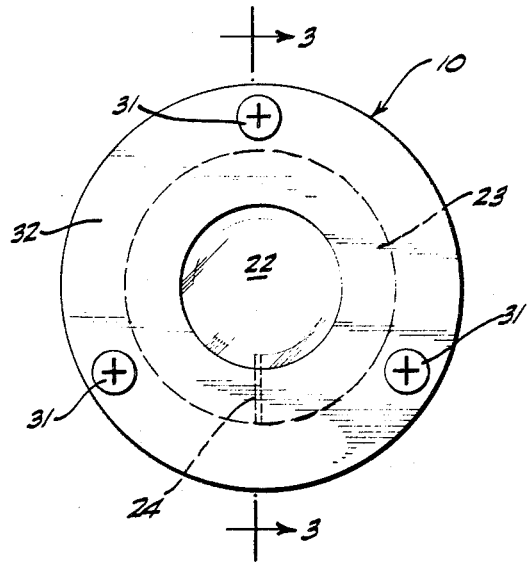
FIG. 2 is a rear elevational view showing details of the resonant reflector at the side of the reflector entered by the output beam of the laser.

Details of a specific embodiment of a resonant reflector 10, according to the invention, and of the type shown in FIG. 1, are shown in FIGS. 2 and 3. The two transparent layers or plates 21 and 22 are made of glass chosen, as pointed out hereinabove, for the desired index of refraction and reflectivity with the laser material employed. For example, glass discs 21 and 22 each are made 0.250 inch thick to equal each other within ⅛ wavelength of the frequency for which the reflector is to be employed.

A spacer ring 23, which also is made of glass, or other suitable material, also is made 0.250 inch thick. The surfaces of discs 21 and 22 and of spacer ring 23 are made perfectly parallel within ⅛ wavelength of the frequency involved. A groove 24 can be formed for relief of air when expanded by heat generated by the laser output beam 14 introduced into reflector 10.

The resonant reflector assembly 10 consisting of front and rear plates or discs 21 and 22, respectively, spaced by spacer ring 23 is mounted in the front end of a laser housing 26, as best shown in FIG. 3. An annular gasket 27 is inserted in opening 28 around output hole 29 and in front of front resonant reflector disc 21. Resonant reflector assembly 10 is mounted in opening 28 with the aid of screws 31 passed through clamping ring 32 and threaded into taps in laser housing 26.

In operation, a laser output beam 14 is passed into the rear of resonant reflector assembly 10 through the central opening in clamping ring 32, into rear disc 22, air layer 33 in the central opening of spacer ring 23, front disc 21 and out through the opening in gasket 27 and output hole 29, as indicated at 34 in FIG. 1. A portion of the laser output beam 14, depending upon the characteristics of the beam, of the discs 21 and 22 and of the air 33, or other low dielectric layer, as described hereinabove, is reflected from the four interfaces 36, 37, 38 and 39 of discs 22 and 21, back into the laser material 11. Reflectivities of from about 40 to about 80 readily can be built into the resonant reflector 10.

Obviously many other modifications and variations of the present invention are possible in the light of the above teachings. It is therefore to be understood that within the scope of the appended claims the invention can be practiced otherwise than as specifically described.

What is claimed is:

1. A laser output beam resonant reflector which comprises two layers of transparent plane parallel plate material of substantially equal thickness of relatively higher index of refraction separated in plane parallel relationship by a layer of relatively low index of refraction material, the thicknesses of the three layers being predetermined so that each layer has a plurality of resonances within the fluorescent line width of the laser output beam for which the resonant reflector is intended.

2. A laser output beam resonant reflector according to claim 1, wherein the thicknesses of each of the three layers are predetermined so that each layer has at least about five resonances within the fluorescent line width of the laser output beam for which the resonant reflector is intended.

3. A laser output beam resonant reflector according to claim 1, wherein the thicknesses of each of the three layers are predetermined so that each layer has at least about eight resonances within the fluorescent line width of the laser output beam for which the resonant reflector is intended.

4. A laser output beam resonant reflector which comprises two layers of solid transparent plane parallel plate material of substantially equal thickness separated in plane parallel relationship by a layer of gaseous material, the thicknesses of the two layers of solid material and the thickness of the layer of gaseous material being predetermined so that each of the three layers has a plurality of resonances within the fluorescent line width of the laser output beam for which the resonant reflector is intended.

5. A laser output beam resonant reflector according to claim 4, wherein the thicknesses of each of the three layers are predetermined so that each layer has at least about five resonances within the fluorescent line width of the laser output beam for which the resonant reflector is intended.

6. A laser output beam resonant reflector according to claim 4, wherein the thickness of each of the three layers are predetermined so that each layer has at least about eight resonances within the fluorescent line width of the laser output beam for which the resonant reflector is intended.

7. A laser output beam resonant reflector which comprises two layers of a solid transparent plane parallel plate material of equal thickness within about one-eighth wavelength of the frequency for which the reflector is intended and separated in plane parallel relationship by a layer of air, the four interfaces of the two layers of solid material being parallel within about one-eighth wavelength of the frequency for which the reflector is intended and the thicknesses of the two layers of solid material and the thickness of the layer of air being predetermined so that each of the three layers has a plurality of resonances within the fluorescent line width of the laser output beam for which the resonant reflector is intended.

8. A laser output beam resonant reflector which comprises two layers of plane parallel glass plate of substantially equal thickness separated in plane parallel relationship by a layer of air, the thickness of the layer of air being predetermined so that it has a plurality of resonances within the fluorescent line width of the laser output beam for which the resonant reflector is intended.

9. A laser output beam resonant reflector which comprises two layers of plane parallel sapphire plate of substantially equal thickness separated in plane parallel relationship by a layer of air, the thickness of the layer of air being predetermined so that it has a plurality of resonances within the fluorescent line width of the laser output beam for which the resonant reflector is intended.

10. A laser output beam resonant reflector which comprises two layers of plane parallel quartz plate of substantially equal thickness separated in plane parallel relationship by a layer of air, the thickness of the layer of air being predetermined so that it has a plurality of resonances within the fluorescent line width of the laser output beam for which the resonant reflector is intended.

References Cited

Burch: "Design of Resonators," Quantum Electronics, 1963, Paris conference, held in Paris, France, Feb. 11–15, 1963. Collection of papers edited by Grivet and Bloombergen and published by Columbia University Press, New York.

Roess: "Ruby Laser With Mode-Selective Etalon Reflector," Proc. IEEE, vol. 52, pp. 196–197, February 1964.

RONALD L. WIBERT, Primary Examiner

U.S. Cl. X.R.

356—112